(12) United States Patent
Devreese

(10) Patent No.: US 11,724,593 B2
(45) Date of Patent: Aug. 15, 2023

(54) ELECTRIC AXLE ASSEMBLY AND OPERATING METHOD

(71) Applicant: Dana Automotive Systems Group, LLC, Maumee, OH (US)

(72) Inventor: Thibault Devreese, Ghent (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/381,050

(22) Filed: Jul. 20, 2021

(65) Prior Publication Data

US 2023/0023920 A1    Jan. 26, 2023

(51) Int. Cl.
*B60K 17/04*    (2006.01)
*B60K 1/00*    (2006.01)
*F16H 3/72*    (2006.01)

(52) U.S. Cl.
CPC .............. *B60K 17/046* (2013.01); *B60K 1/00* (2013.01); *F16H 3/725* (2013.01); *B60K 2001/001* (2013.01); *B60Y 2400/73* (2013.01); *F16H 2200/0021* (2013.01); *F16H 2200/2005* (2013.01); *F16H 2200/2035* (2013.01)

(58) Field of Classification Search
CPC ........... B60K 17/046; B60K 1/00; F16H 3/44; F16H 3/54
See application file for complete search history.

(56) References Cited

U.S. PATENT DOCUMENTS

| | | | |
|---|---|---|---|
| 5,554,080 A * | 9/1996 | Dangel | F16H 3/64 475/221 |
| 6,811,514 B2 | 11/2004 | Bowman | |
| 7,867,125 B2 | 1/2011 | Kim et al. | |
| 8,668,614 B2 | 3/2014 | Sherrill et al. | |
| 8,992,361 B2 | 3/2015 | Doleschel et al. | |
| 9,527,382 B2 | 12/2016 | Smetana | |
| 9,707,834 B2 | 7/2017 | Lee et al. | |
| 9,950,607 B2 | 4/2018 | Littlefield et al. | |
| 10,760,653 B2 * | 9/2020 | Schilder | B60K 1/00 |
| 2021/0107345 A1 * | 4/2021 | Cooper | B60K 6/52 |

FOREIGN PATENT DOCUMENTS

WO    2018102012 A1    6/2018

* cited by examiner

*Primary Examiner* — Derek D Knight
(74) *Attorney, Agent, or Firm* — McCoy Russell LLP

(57) ABSTRACT

Methods and systems for an electric axle assembly are provided herein. The electric axle assembly includes, in one example, an electric machine with a rotor shaft having an output gear thereon. The electric axle assembly further includes a planetary gearset with a carrier coupled to a pair of axle shafts, a first ring gear with external teeth that are rotationally coupled to the output gear; and a sun gear meshing with a plurality of planet gears that rotate on the carrier, where, in the axle assembly, internal teeth of the ring gear are rotationally coupled to the plurality of planet gears, and where, in the axle assembly, the sun gear or the carrier are grounded by a housing of the electric axle assembly.

18 Claims, 5 Drawing Sheets

ELECTRIC AXLE ASSEMBLY AND OPERATING METHOD

TECHNICAL FIELD

The present disclosure relates to an electric axle with a ring gear that has inner and outer teeth.

BACKGROUND AND SUMMARY

Electric axles have been used in vehicles due to their greater adaptability in regard to vehicle integration when compared to electric drive arrangements that utilize electric motors and final drive assemblies which are not collocated. Performance targets such as the axle's gear ratio and structural integrity may be at odds with space efficiency objectives in certain electric axle designs.

US 2021/0107345 A1 to Cooper et al. teaches an electric drive unit for an axle with torque vectoring clutches that are attached to a motor using a structurally complex gearing arrangement. In Cooper's drive unit, the torque vectoring devices are attached to axle shafts.

The inventor has recognized several drawbacks with Cooper's electric drive unit as well as other electric drive units. Cooper's electric drive unit has a large number of shafts, bearings, and gears which decrease the unit's space efficiency and increase the unit's weight. Increased weight may be particularly undesirable in electric axles where the added weight contributes to the vehicle's unsprung mass which decreases suspension and more generally handling performance.

To address at least a portion of the abovementioned issues, the inventor has developed an electric axle assembly. The electric axle assembly includes an electric machine with a rotor shaft having an output gear thereon. The axle assembly further includes a planetary gearset with a carrier coupled to a pair of axle shafts and a first ring gear with external teeth that are rotationally coupled to the output gear. The planetary gearset further includes a sun gear that meshes with a plurality of planet gears which rotate on the carrier. In the planetary gearset, internal teeth of the ring gear are rotationally coupled to the plurality of planet gears. Further, in the planetary gearset, the sun gear or the carrier are grounded by a housing of the electric axle assembly. In this way, a short power path with a desired gear ratio is achieved. The weight of the electric axle can resultantly be decreased along with the axle's size. Because of the decreased weight and size, the axle's adaptability is significantly increased and the handling performance particularly with regard to suspension kinematics may be enhanced, if wanted.

Further, in one example, the sun gear may be grounded and the electric axle assembly may additionally include a pair of torque vectoring devices that are positioned between the pair of axle shafts and the carrier. In such an example, the housing may enclose the electric machine, the planetary gearset, and the pair of torque vectoring devices. In this way, the planetary gear reduction is space efficiently attached to the torque vectoring devices, thereby permitting the axle's tractive performance to be compactly increased.

In another example, the electric machine (e.g., electric motor-generator) may be coaxial with the pair of axle shafts. In such an example, the carrier may be grounded and a plurality of intermediate gears mesh with the external teeth of the first ring gear. The planetary gearset further includes a second ring gear that meshes with external teeth of the first ring gear and the plurality of planet gears. Profiling the axle assembly with coaxially arranged axle shafts and an electric machine may decrease the space constraints that the axle poses on other vehicle systems such as the vehicle frame, suspension system, and traction battery system. Consequently, the suspension system's performance may be enhanced or the energy storage capacity may be increased, if wanted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. FIGS. 6A-6B are drawn approximately to scale. However, other relative component dimensions may be used, in other embodiments.

DETAILED DESCRIPTION

An electric drive axle which achieves a compact design and an efficient power path through a planetary gearset is described herein. To realize the compactness and power path efficiency in the drive axle, a rotor shaft of an electric motor includes a gear that rotationally attaches to a ring gear with teeth on both interior and exterior surfaces. Specifically, in one example, the rotor shaft gear may directly mesh with the exterior ring gear teeth. Continuing with this example, the sun gear may be grounded to a housing and the carrier serves as an output of the planetary gearset that is coupled to axle shafts. In this manner, a desired speed reduction and torque increase can be achieved in the gearset which increases motor efficiency. For instance, the geartrain's ratio may have a wide flexibility due to the kinematic relationship between the components in the planetary gearset. For instance, when a lower gear ratio is desired, the sun gear size may be increased and vice versa. Specifically, in one example, the ring gear to sun gear ratio in the planetary gearset may be comparatively low. A low ring gear to sun gear ratio allows the sun gear diameter to be increased to enable a hollow shaft connection from the carrier to a differential or torque vectoring devices. In one example, torque vectoring devices may be arranged between the output carrier and the axle shafts to permit axle shaft speeds to be independently augmented to enhance electric axle performance. In another example, the electric motor and the axle shafts may be coaxially arranged. To realize this compact arrangement, a second ring gear may be included in the planetary gearset which meshes with the external teeth of the first ring gear and a plurality of planet gears that mesh with a sun gear that is attached to a differential. In the coaxial electric drive axle arrangement, the carrier is grounded by the axle's housing. The coaxial motor and axle shaft arrangement may pose less packaging constraints on surrounding components, such as the vehicle's suspension and energy storage systems. The vehicle's suspension performance and/or energy storage capacity may be increased as a result, if desired.

Figure 1:
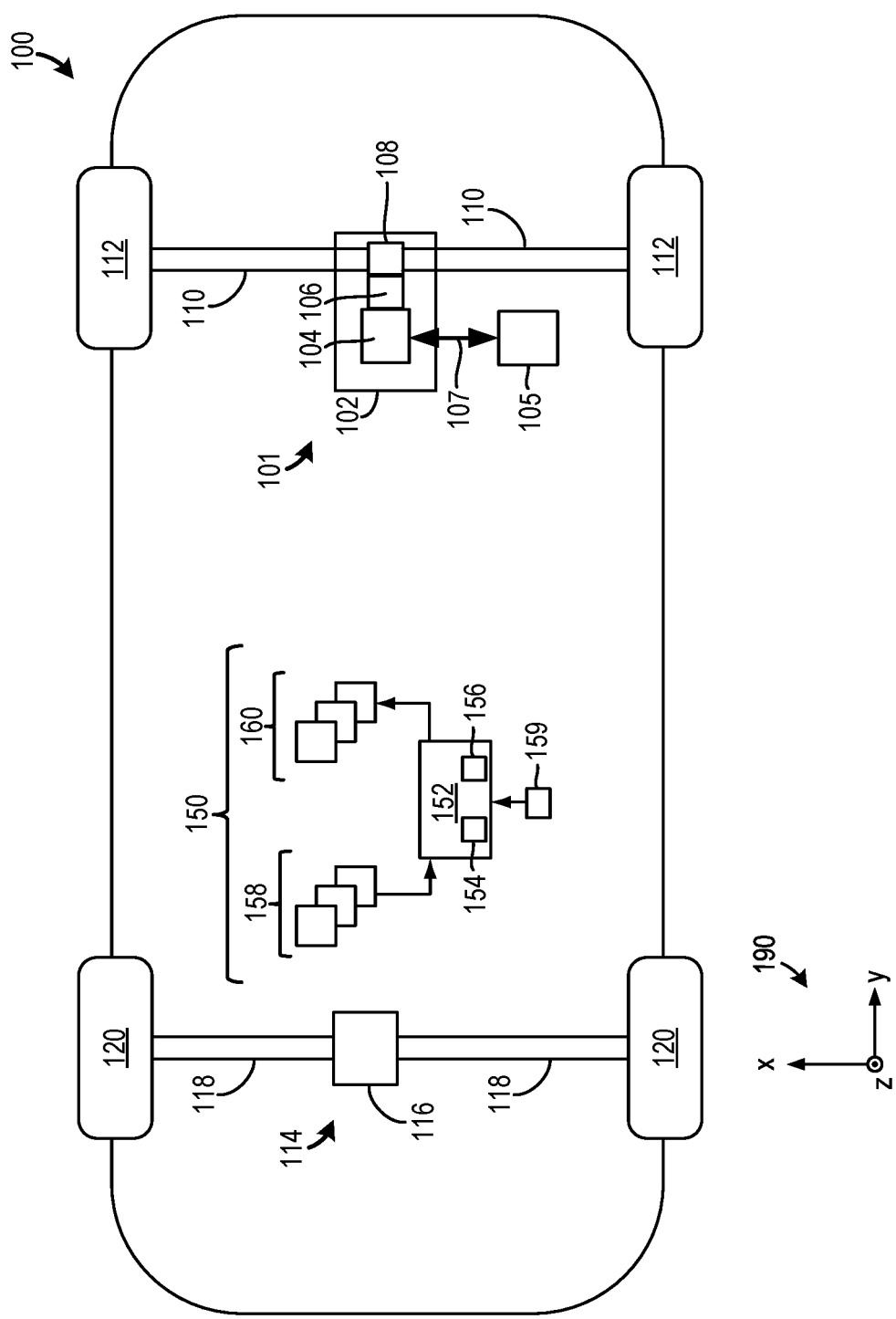
FIG. 1 shows a vehicle with an electric drive axle.

A vehicle 100 is depicted in FIG. 1 with a powertrain 101. The vehicle components are schematically illustrated in FIG. 1 but it will be understood that the components have greater structural complexity that is expanded upon herein with regard to FIGS. 2-6B. The powertrain 101 includes an electric axle assembly 102. The vehicle 100 may be a light, medium, or heavy duty vehicle. The electric axle assembly 102 includes an electric machine 104 (e.g., an electric motor-generator such as a multi-phase electric motor-generator) designed to generate motive power and transfer said power to a geartrain 106 with a planetary gearset. Specifically, in one example, the geartrain may be a one-speed geartrain that does not include clutches or brakes which provide gear shift operation. Different geartrain arrangements are described in greater detail herein with regard to FIGS. 2-5. Additionally, the electric machine 104 may be electrically coupled to an energy storage device 105 (e.g., a traction battery). Arrow 107 denotes the flow of power between the energy storage device 105 and the electric machine 104. In the multi-phase electric motor example, an inverter may be used to provide electrical energy to the motor and may be designed to operate with the same number of phases as the electric motor.

The geartrain 106 may be coupled to a differential 108, in one example, or a pair of torque vectoring devices, in other examples. The differential 108, or torque vectoring devices in the alternate example, are rotationally coupled to axle shafts 110. In turn, the axle shafts 110 are rotationally coupled to drive wheels 112. The axle shafts 110 may be conceptually included in the electric axle.

The electric axle assembly 102 may be a front or rear axle. In either case, a second axle 114 may be included in the vehicle 100. The second axle 114 may include a differential 116 and axle shafts 118 connected to drive wheels 120. Further, as illustrated, the second axle 114 is a non-drive axle and may be steerable. However, in alternate arrangement, the second axle 114 may be an electric axle or may be coupled to an internal combustion engine. In the internal combustion engine example, the vehicle is a hybrid electric vehicle (HEV), although the vehicle 100 may be an electric vehicle (EV), in the other examples.

The vehicle 100 may further include a control system 150 with a controller 152 as shown in FIG. 1. The controller 152 may include a microcomputer with components such as a processor 154 (e.g., a microprocessor unit), input/output ports, an electronic storage medium 156 for executable programs and calibration values, e.g., a read-only memory chip, random access memory, keep alive memory, a data bus, and the like. The storage medium may be programmed with computer readable data representing instructions executable by a processor for performing the methods and control techniques described herein as well as other variants that are anticipated but not specifically listed.

The controller 152 may receive various signals from sensors 158 coupled to various regions of vehicle 100. For example, the sensors 158 may include a motor speed sensor, a pedal position sensor to detect a depression of an operator-actuated pedal, such as an accelerator pedal or a brake pedal, speed sensors at the vehicle wheels 112 and 120, etc. An input device 159 (e.g., accelerator pedal, brake pedal, combinations thereof, etc.) may further provide input signals indicative of an operator's intent for vehicle control.

Upon receiving the signals from the various sensors 158 of FIG. 1, the controller 152 processes the received signals, and employs various actuators 160 of vehicle components to adjust the components based on the received signals and instructions stored on the memory of controller 152. For example, the controller 152 may receive an accelerator pedal signal indicative of an operator request for increased vehicle acceleration. In response, the controller 152 may command operation of the electric machine 104 to adjust actuators in the electric machine to alter machine power output to increase the power delivered from the machine to the drive wheels via the geartrain. The other controllable components in the vehicle may function in a similar manner with regard to sensor signals, control commands, and actuator adjustment, for example.

An axis system 190 is provided in FIG. 1, as well as FIGS. 2-6B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2A:
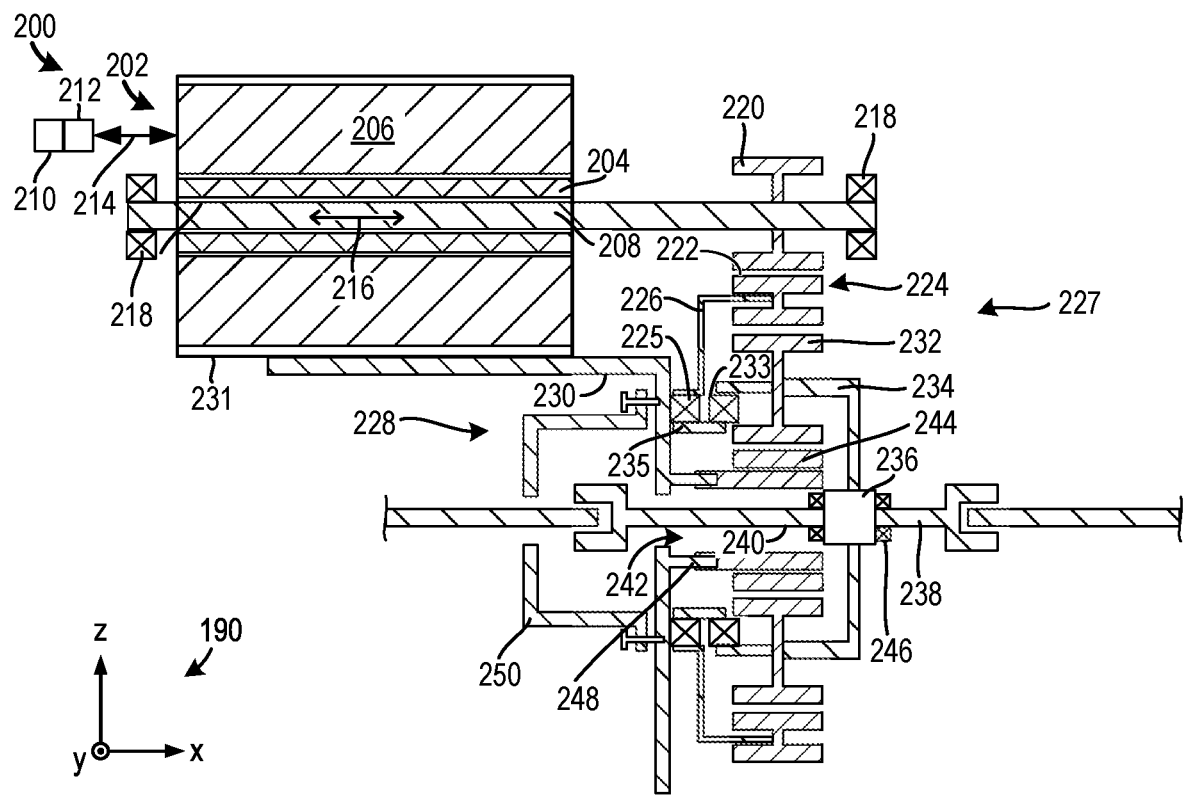
FIGS. 2A and 2B show a first example of an electric axle assembly.

FIG. 2A shows a first example of an electric axle assembly 200. The electric axle assembly 200 includes an electric machine 202 (e.g., electric motor-generator). The electric machine 202, as well as the other electric machines described herein include a rotor 204 and a stator 206 that electromagnetically interact to generate rotational energy. The rotor 204 rotates on a rotor shaft 208. Furthermore, the electric machines described herein may be alternating current (AC) type motors such as multi-phase motors. In such an example, the electric machine 202 may be coupled to an energy storage device 210 (e.g., traction battery) by way of an inverter 212 (e.g., a multi-phase inverter). Arrows 214 indicate the power transfer that can occur between the energy storage device 210 and the electric machine 202.

The rotor shaft 208 extends axially outward from an enclosure of the electric machine 202. The rotational axis 216 of the electric machine 202 is provided for reference. Bearings 218 may be coupled to opposing axial sides of the rotor shaft 208. A rotor shaft gear 220, functioning as an output gear, is fixedly coupled to the rotor shaft 208 and rotates thereon during motor operation. It will be understood that the gears described herein include teeth that are designed to mesh with teeth on an adjacent gear and facilitate power transfer therebetween.

Figure 6A:
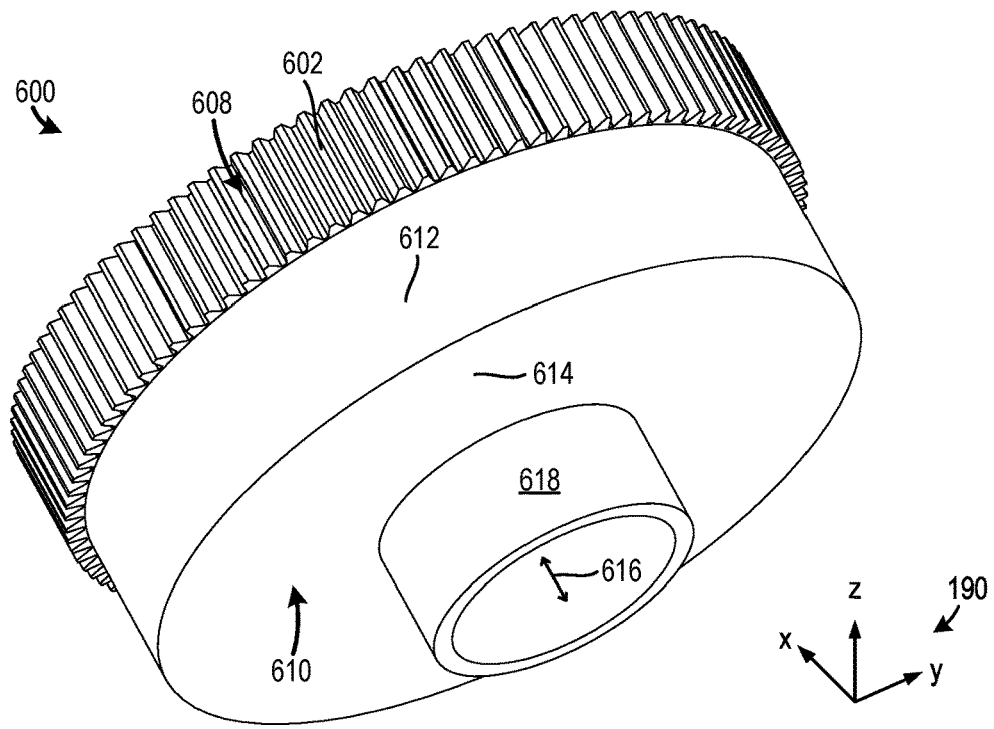
FIGS. 6A and 6B show different perspective views of an example of a ring gear with external and internal teeth.
Figure 6B:
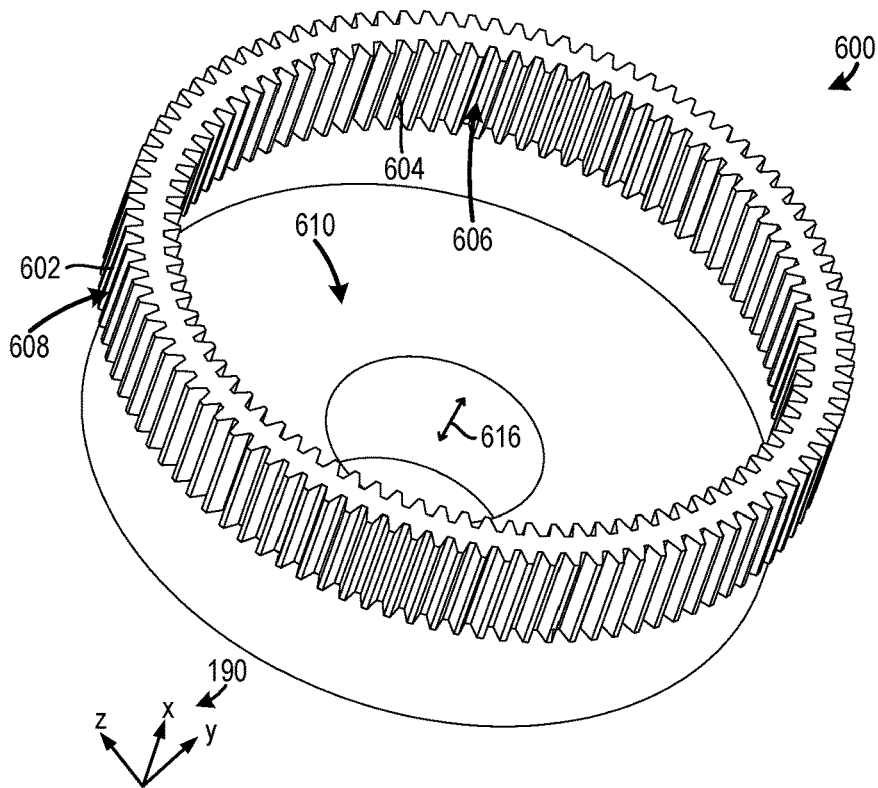

The rotor shaft gear 220 meshes with teeth on an external surface 222 of a ring gear 224 in a planetary gearset 227. An example of a ring gear 600 with external teeth 602 and internal teeth 604 is illustrated in FIGS. 6A and 6B. The ring gear 600 specifically includes an internal surface 606 with the internal teeth 604 and an external surface 608 with the external teeth 602. The ring gear 600 may further include a body 610. A first section 612 of the body 610 may extend away from the external teeth 602 in an axial direction and a second section 614 of the body may extend radially inward towards the gear's rotational axis 616. The first section 612 may have a smaller diameter than the outer diameter of the teeth 602. The body 610 may further include an inner extension 618 that may be coupled to a bearing. Specifically, an inner circumferential surface may mate with an outer race of a bearing. In this way, the ring gear 600 may be permitted to rotate in relation to the axle's housing. By providing a ring gear with inner and outer gear engagement functionality the number of axle components such as shafts and bearings may be reduced, if desired. In this way, the axle's complexity may be reduced along with the likelihood of component degradation. The internal and external teeth in the ring gear 600 are specifically illustrated as straight cut teeth. However, the teeth may have a helical arrangement, in other examples.

Returning to FIG. 2A, one or more bearings 225 (e.g., a set of two bearings) may be coupled to the body 226 of the ring gear 224. In this way, the ring gear 224 may be supported and permitted to rotate. The bearing 225 may be attached to a housing 228 of the electric axle assembly 200. In particular, the bearing 225 may be attached to a section 230 of the housing 228 that extends along a motor housing 231 and may attach thereto. As described herein, a bearing may be a roller type bearing with roller elements (e.g., spherical rollers, cylindrical rollers, tapered cylindrical rollers, and the like) that are enclosed by inner and outer races.

Inner teeth of the ring gear 224 mesh with multiple planet gears 232 on a carrier 234 in the planetary gearset 227. A bearing 233 may be coupled to the carrier 234 and a section 235 of the housing 228. The bearing 233 supports and enables rotation of the carrier 234. In this way, the carrier 234 and the ring gear 224 may be allowed to rotate.

Figure 2B:
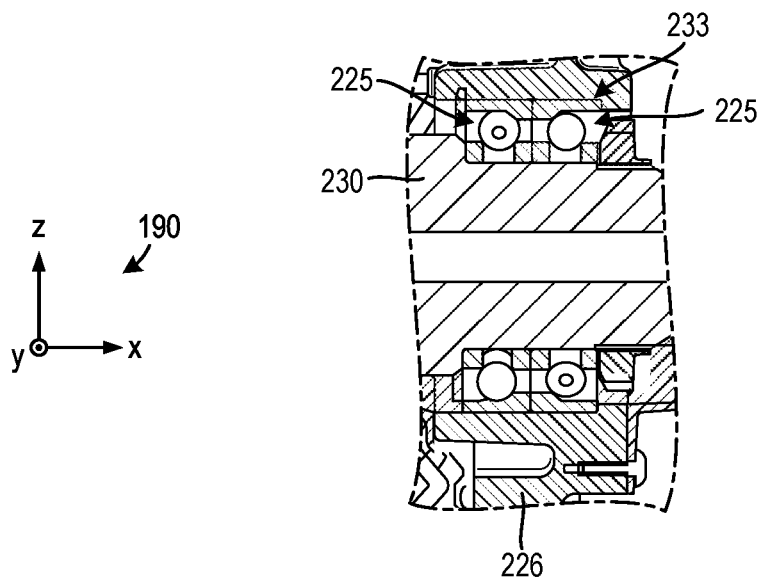

A detailed view of an example of the bearings 225 in shown in FIG. 2B. The bearings 225 are specifically illustrated as angular contact ball bearings that are adjacent to one another, to increase axle space efficiency. Alternatively, in other embodiments, the bearings 225 may be spaced away from one another and may have another suitable configuration such as cylindrical roller bearings, needle roller bearings, etc. As illustrated, the inner races of the bearings 225 are coupled to the housing section 230 and the outer races of the bearings are coupled to a section of the body 226 of the ring gear 224. In this way, the bearings may be space efficiently incorporated into the electric axle. However, other arrangements of the bearings and the ring gear may be used, in other embodiments.

Returning to FIG. 2A, the carrier 234, in the illustrated example, is rotationally coupled to a differential 236. The differential 236 may be designed as a planetary differential that may include a case functioning as a carrier on which two sets of planet gears rotate and mesh with two sun gears that are coupled to axle shafts. In this way, the electric axle's compactness is further increased. However, a different type of differential may be used in alternate embodiments such as a differential with spider gears that mesh with bevel gears, a locking differential, etc.

The differential 236 is coupled to axle shafts 238, 240. The axle shaft 240 extends through a central opening 242 of a sun gear 244 in the planetary gearset 227. In this way, the axle's compactness is increased. Bearings 246 may be coupled to the differential 236 to permit rotation of the axle shafts 238, 240.

The sun gear 244 meshes with the planet gears 232 that ride on the carrier 234. The sun gear 244 is grounded by the housing 228, in the illustrated example. Grounding the sun gear to the housing while providing a ring gear with both internal and external teeth permits the axle assembly to achieve greater space efficiency while at the same time permitting a wide range of geartrain ratio adaptability. In this way, the electric axle assembly may have wide applicability across a large breadth of vehicle platforms.

The housing 228 may ground the sun gear 244 by way of an axial extension 248. Additionally, another housing section 250 may bolt on or otherwise mechanically attach to the housing section 230. The housing section 250 may at least partially circumferentially surround the axle shaft 240.

Figure 7:
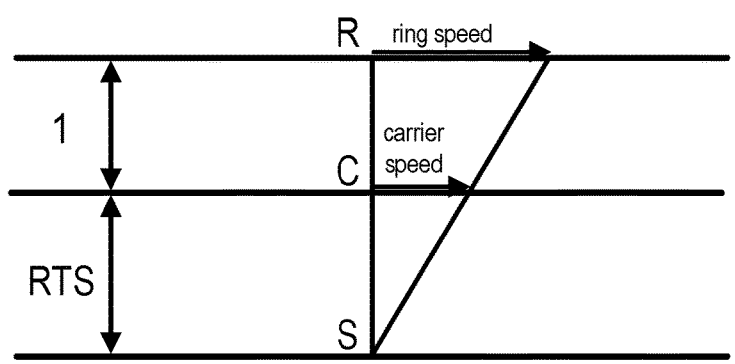
FIG. 7 shows a use-case speed diagram for the planetary gearset, depicted in FIG. 2A.

FIG. 7 shows a use-case speed diagram for the planetary gearset 227. The horizontal axes indicate the speeds of the ring gear, carrier, and sun gear. In particular, the ring gear speed is greater than the carrier speed and the sun gear speed is zero due to the grounding of the sun gear. A lower ring to sun (RTS) value may provide a higher ratio reduction. In one example, a lower RTS value may be used to enable the diameter of the sun gear to be increased to allow a hollow shaft connection from the carrier to the differential (or torque vectoring devices, in other embodiments).

Figure 3:
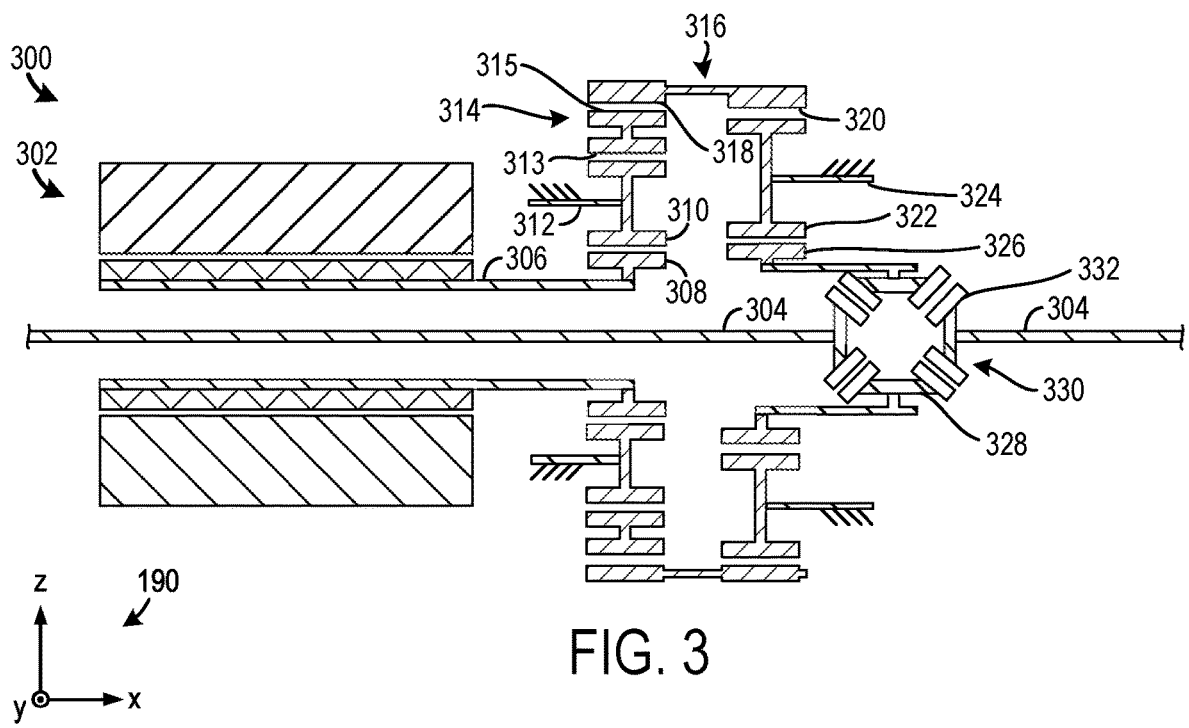
FIG. 3 shows a second example of an electric axle assembly with an electric machine and the axle shafts coaxially arranged.

FIG. 3 shows another example of an electric axle assembly 300. The electric axle 300 again includes an electric machine 302 such as an electric motor-generator. However, the electric machine 302 depicted in FIG. 3 is arranged coaxial to the axle shafts 304. Therefore, in the coaxial arrangement, the electric machine 302 includes a central opening with one of the axle shafts 304 extending therethrough. The coaxial arrangement may increase the axle's space efficiency and pose less space constraints on surrounding vehicle components such as the vehicle's suspension system.

A rotor shaft 306 of the electric machine 302 includes an output gear 308 that resides thereon. The output gear 308 is coupled to a first set of planet gears 310 that are grounded via a shaft 312. The planet gears 310 mesh with internal teeth 313 of a first ring gear 314. The ring gear 314 again includes external teeth 315 that mesh with a second ring gear 316. The second ring gear 316 specifically includes a first set of teeth 318 that mesh with the external teeth and a second set of teeth 320 that mesh with a second set of planet gears 322. The second set of planet gears 322 are grounded via a shaft 324 and further mesh with a sun gear 326. Further, the sun gear 326 is rotationally coupled to a case 328 of a differential 330. The case of the differential may have spider gears that rotate thereon and mesh with side gears 332.

Figure 4:
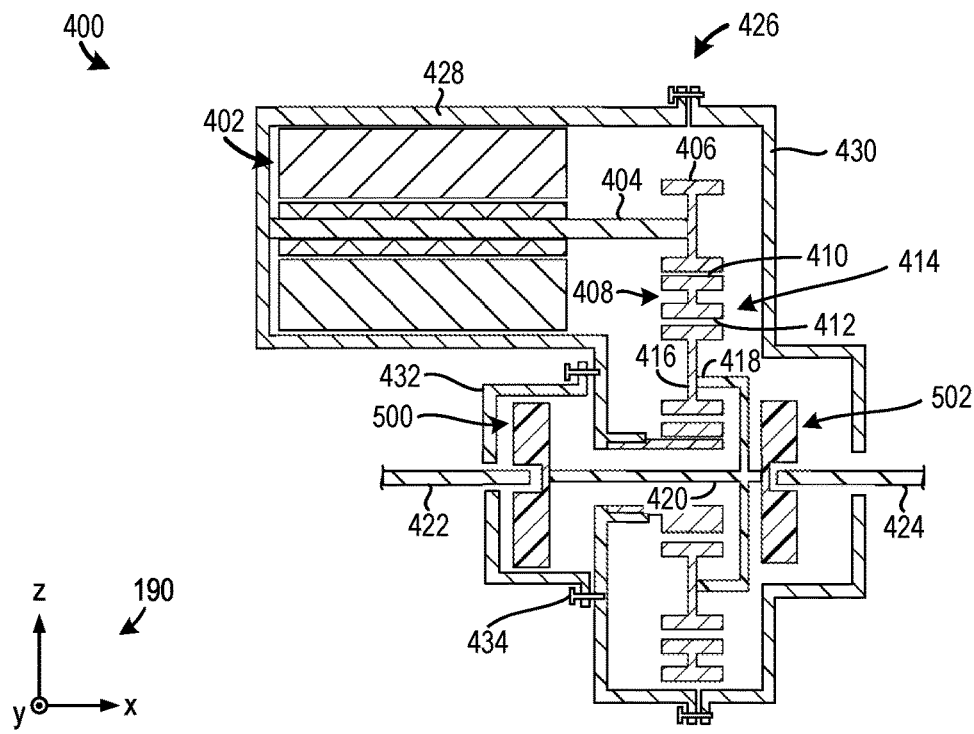
FIG. 4 shows a third example of an electric axle assembly with torque vectoring devices.
Figure 5:
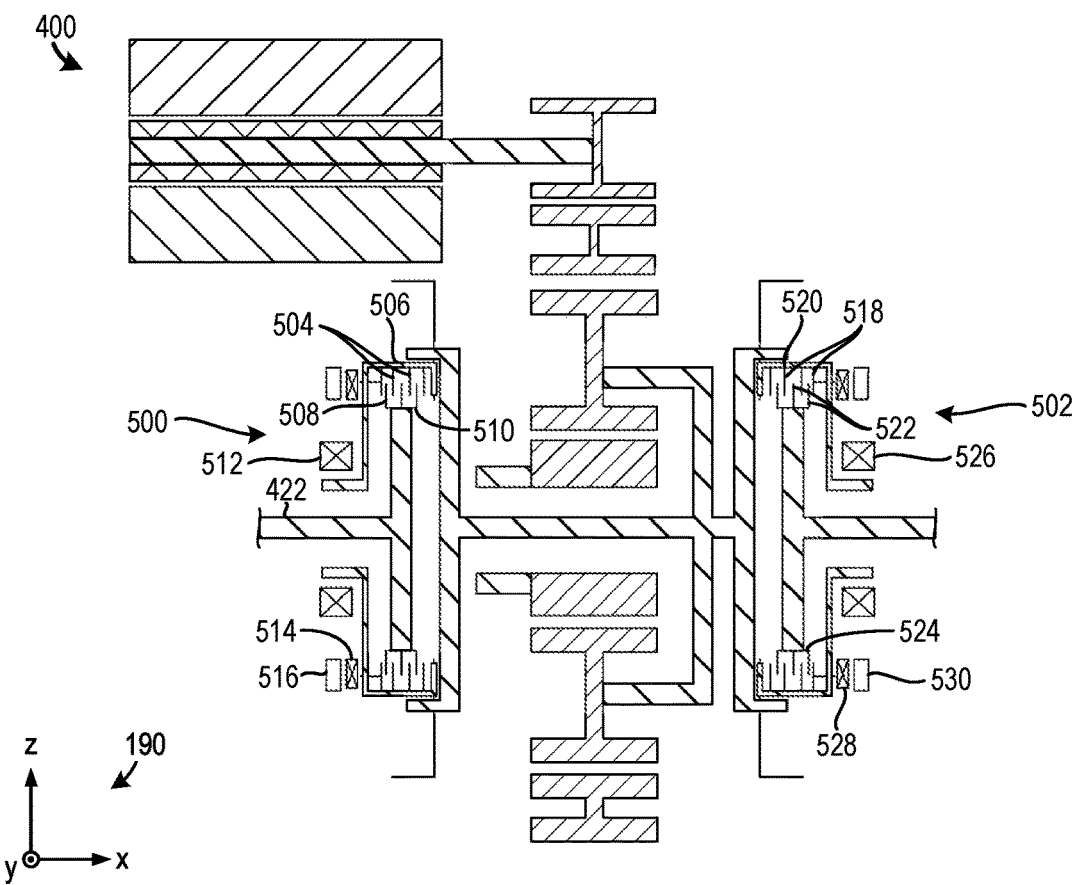
FIG. 5 shows a detailed illustration of the torque vectoring devices, included in the electric axle assembly, depicted in FIG. 4.

FIGS. 4 and 5 illustrate varying levels of detail of another example of an electric axle assembly 400. FIG. 4 shows an arrangement of a housing in the axle assembly 400 while FIG. 5 shows a detailed illustration of torque vectoring devices 500, 502 in the axle assembly 400.

Turning to FIG. 4, the electric axle assembly 400 again includes an electric machine 402 with a rotor shaft 404 with an output gear 406 coupled thereto. The output gear 406 meshes with a ring gear 408 that includes exterior teeth 410 and interior teeth 412. Thus, the ring gear 600, shown in FIGS. 6A and 6B may be used in the electric axle assembly 400. More generally, the ring gear 408 is included in a planetary gearset 414. The planetary gearset 414 further includes planet gears 416 rotating on carrier 418 that is rotationally coupled to a shaft 420. The shaft 420 extends between the pair of torque vectoring devices 500, 502. In turn, axle shafts 422, 424 are coupled to the torque vectoring devices 500, 502.

A housing 426, depicted in FIG. 4, includes a first section 428 at least partially enclosing the electric machine 402. A second housing section 430 encloses a portion of the planetary gearset 414 and the torque vectoring device 502. Further, a third housing section 432 encloses the torque vectoring device 500. Attachment device 434 (e.g., bolts, screws, clamps, etc.) may be used to couple the housing sections to one another. In this way, the electric motor, torque vectoring devices, and planetary gearset may be efficiently accessed. Housing arrangements with different profiles and partitions may be used, in other examples.

FIG. 5 shows a detailed view of the torque vectoring devices 500, 502 in the electric axle assembly 400 with the housing omitted. The planetary gearset 414 is again shown.

The torque vectoring device 500 includes a first set of plates 504 coupled to a clutch drum 506 and a second set of plates 508 coupled to a clutch can 510. The clutch can 510 is rotationally coupled to the axle shaft 422. The torque vectoring device 500 may further include a clutch drum bearing 512 and a thrust bearing 514 that permits a clutch actuation mechanism 516 to rotate. The clutch actuation mechanism 516 may be hydraulically actuated and designed to engage and disengage the plates 504, 508 in the device to permit varying amount of torque transfer through the torque vectoring device to the corresponding axle shaft or vice versa. Thus, the torque vectoring devices may be designed for continuous adjustment between an open configuration where torque transfer from the device to the axle shaft is inhibited and a fully closed configuration where all of the torque from the drum is transferred to the clutch can.

The torque vectoring device 502 may be similar to the torque vectoring device 500 and again includes a first set of plates 518, a clutch drum 520, a second set of plates 522, a clutch can 524, a clutch drum bearing 526, a thrust bearing 528, and a clutch actuation mechanism 530. Each of the clutch actuation mechanisms 516, 530 may be electronically controlled. For instance, controller 152, shown in FIG. 1 may induce actuation of the torque vectoring devices 500, 502. The The electric axle assemblies shown in FIGS. 2-5 may share some common structural and functional features. For instance, the electric machines in each of the axle assemblies may have similar components.

In any of the electric axle assembly embodiments described above, a method for electric axle operation may be implemented. The method may be carried out as instructions stored in memory executed by a processor in a controller. As such, performing the method steps may include sending and/or receiving commands which trigger adjustment of associate components, as previously indicated. The method includes transferring rotational energy from the electric machine to the ring gear of the planetary gearset. The method may further include independently adjusting the speed of the axle shafts via operation of the pair of torque vectoring devices positioned between the pair of axle shafts and the carrier. The speed of the axle shafts may be adjusted during cornering, low traction conditions, etc. to increase the vehicle's handling performance.

The technical effect of the electric axle assembly operating method described herein is to increase motor efficiency via a planetary gearset that compactly attains a targeted speed reduction and torque increase.

FIGS. 1-6B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric axle assembly is provided that comprises an electric machine with a rotor shaft having an output gear thereon; a planetary gearset including: a carrier coupled to a pair of axle shafts; a first ring gear with external teeth that are rotationally coupled to the output gear; and a sun gear meshing with a plurality of planet gears that rotate on the carrier; wherein internal teeth of the first ring gear are rotationally coupled to the plurality of planet gears; and wherein the sun gear or the carrier are grounded by a housing of the electric axle assembly.

In another aspect, a method for operating a one-speed electric axle assembly is provided that comprises transferring rotational energy from an electric machine to a ring gear of a planetary gearset; wherein the planetary gearset includes: a carrier coupled to a pair of axle shafts; the ring gear with external teeth that are rotationally coupled to an output gear of the electric machine; and a sun gear meshing with a plurality of planet gears that rotate on the carrier; wherein internal teeth of the ring gear are rotationally coupled to the plurality of planet gears; and wherein the sun gear or the carrier are grounded by a housing of the electric axle assembly. The method may further comprise, in one example, independently adjusting the speeds of the axle shafts via operation of a pair of torque vectoring devices positioned between the pair of axle shafts and the carrier.

In yet another aspect, a one-speed electric axle assembly is provided that comprises an electric motor-generator with a rotor shaft having an output gear thereon; a planetary gearset including: a carrier coupled to a pair of axle shafts; a ring gear with external teeth that mesh with the output gear; and a sun gear meshing with internal teeth in the ring gear and a plurality of planet gears that rotate on the carrier; and wherein the sun gear is grounded by a housing; and wherein the housing encloses the electric motor-generator and the planetary gearset.

In any of the aspects or combinations of the aspects, the sun gear may be grounded and the electric axle assembly may further comprise a pair of torque vectoring devices positioned between the pair of axle shafts and the carrier.

In any of the aspects or combinations of the aspects, the first ring gear may include an extension supported by one or more angular contact bearings coupled to the housing.

In any of the aspects or combinations of the aspects, the housing may enclose the electric machine, the planetary gearset, and the pair of torque vectoring devices.

In any of the aspects or combinations of the aspects, the electric axle assembly may be a one-speed electric axle assembly.

In any of the aspects or combinations of the aspects, the electric machine may be coaxially arranged with the pair of axle shafts.

In any of the aspects or combinations of the aspects, the carrier may be grounded and a plurality of intermediate gears may mesh with the external teeth of the first ring gear and the planetary gearset may further comprise a second ring gear that meshes with external teeth of the first ring gear and the plurality of planet gears.

In any of the aspects or combinations of the aspects, the electric axle assembly may further comprise a differential coupled to the sun gear and the pair of axle shafts.

In any of the aspects or combinations of the aspects, the sun gear may include a hollow shaft with a central shaft that is coupled to the pair of axle shafts and extends through the hollow shaft.

In any of the aspects or combinations of the aspects, the output gear and the planetary gearset may be arranged on a common axial plane that extends from a central axis of the planetary gearset.

In any of the aspects or combinations of the aspects, the sun gear may be grounded and the housing may enclose the electric machine and the planetary gearset.

In any of the aspects or combinations of the aspects, the electric machine may be coaxially arranged with axle shafts; and a rotor shaft of the electric machine may include a central opening with one of the axle shafts extending therethrough.

In any of the aspects or combinations of the aspects, the sun gear may be splined, bolted, and/or welded to a section of the housing.

In any of the aspects or combinations of the aspects, the electric axle assembly may be a solid beam axle.

In any of the aspects or combinations of the aspects, the electric axle assembly may further comprise a pair of torque vectoring devices positioned between the pair of axle shafts and the carrier and wherein the housing encloses the pair of torque vectoring devices.

In any of the aspects or combinations of the aspects, the ring gear may include an extension supported by one or more angular contact bearings coupled to the housing.

In any of the aspects or combinations of the aspects, the planetary gearset may be a single stage planetary gearset.

In any of the aspects or combinations of the aspects, the output gear and the planetary gearset may be arranged on a common axial plane that extends from a central axis planetary gearset.

In any of the aspects or combinations of the aspects, the planetary gearset does not includes any clutches or brakes.

In another representation, an electric beam axle is provided with a drive unit that includes an electric motor, a planetary gear reduction with a ring gear that has outer teeth meshing with an output gear of the electric motor and inner teeth that mesh with a plurality of planet gears on a carrier, wherein the planetary gear reduction includes a sun gear that is grounded to a housing.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations and/or functions may graphically represent code to be programmed into non-transitory memory of the computer readable storage medium in the vehicle and/or drivetrain control system. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the terms "substantially" and "approximately" are construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle assembly, comprising:
   an electric machine with a rotor shaft having an output gear thereon; and
   a planetary gearset including:
     a carrier coupled to a pair of axle shafts;
     a first ring gear with external teeth that are rotationally coupled to the output gear; and
     a sun gear meshing with a plurality of planet gears that rotate on the carrier;
   wherein internal teeth of the first ring gear are rotationally coupled to the plurality of planet gears;
   wherein the sun gear or the carrier is grounded by a housing of the electric axle assembly; and wherein the electric axle assembly is a one-speed electric axle assembly.

2. The electric axle assembly of claim 1, wherein the sun gear is grounded and the electric axle assembly further comprises a pair of torque vectoring devices positioned between the pair of axle shafts and the carrier.

3. The electric axle assembly of claim 2, wherein the first ring gear includes an extension supported by one or more angular contact bearings coupled to the housing.

4. The electric axle assembly of claim 2, wherein the housing encloses the electric machine, the planetary gearset, and the pair of torque vectoring devices.

5. The electric axle assembly of claim 1, wherein the electric machine is coaxially arranged with the pair of axle shafts.

6. The electric axle assembly of claim 5, wherein the carrier is grounded and a plurality of intermediate gears mesh with the external teeth of the first ring gear and the planetary gearset further comprises a second ring gear that meshes with external teeth of the first ring gear and the plurality of planet gears.

7. The electric axle assembly of claim 5, further comprising a differential coupled to the sun gear and the pair of axle shafts.

8. The electric axle assembly of claim 1, wherein the sun gear includes a hollow shaft with a central shaft that is coupled to the pair of axle shafts and extends through the hollow shaft.

9. The electric axle assembly of claim 1, wherein the output gear and the planetary gearset are arranged on a common axial plane that extends from a central axis of the planetary gearset.

10. A method for operating a one-speed electric axle assembly, comprising:
    transferring rotational energy from an electric machine to a ring gear of a planetary gearset; and
    independently adjusting speeds of the axle shafts via operation of a pair of torque vectoring devices positioned between the pair of axle shafts and a carrier;
    wherein the planetary gearset includes:
        the carrier coupled to a pair of axle shafts;
        the ring gear with external teeth that are rotationally coupled to an output gear of the electric machine; and
        a sun gear meshing with a plurality of planet gears that rotate on the carrier;
    wherein internal teeth of the ring gear are rotationally coupled to the plurality of planet gears; and
    wherein the sun gear or the carrier are grounded by a housing of the one-speed electric axle assembly.

11. The method of claim 10, wherein the sun gear is grounded and the housing encloses the electric machine and the planetary gearset.

12. The method of claim 10, wherein:
    the electric machine is coaxially arranged with axle shafts; and
    a rotor shaft of the electric machine includes a central opening with one of the axle shafts extending therethrough.

13. A one-speed electric axle assembly, comprising:
    an electric motor-generator with a rotor shaft having an output gear thereon;
    a planetary gearset including:
        a carrier coupled to a pair of axle shafts;
        a ring gear with external teeth that mesh with the output gear; and
        a plurality of planet gears that rotate on the carrier;
    wherein the plurality of planet gears mesh with internal teeth in the ring gear;
    wherein the sun gear is grounded by a housing; and
    wherein the housing encloses the electric motor-generator and the planetary gearset.

14. The one-speed electric axle assembly of claim 13, further comprising a pair of torque vectoring devices positioned between the pair of axle shafts and the carrier and wherein the housing encloses the pair of torque vectoring devices.

15. The one-speed electric axle assembly of claim 13, wherein the ring gear includes an extension supported by one or more angular contact bearings coupled to the housing.

16. The one-speed electric axle assembly of claim 13, wherein the planetary gearset is a single stage planetary gearset.

17. The one-speed electric axle assembly of claim 13, wherein the output gear and the planetary gearset are arranged on a common axial plane that extends from a central axis planetary gearset.

18. The one-speed electric axle assembly of claim 13, wherein the planetary gearset does not includes any clutches or brakes.

* * * * *